US010802466B2

(12) United States Patent
Mizuno et al.

(10) Patent No.: US 10,802,466 B2
(45) Date of Patent: Oct. 13, 2020

(54) INTEGRATED MACHINING SYSTEM, INTEGRATED MACHINING METHOD AND NON-TRANSITORY COMPUTER READABLE MEDIUM ENCODED WITH PROGRAM

(71) Applicant: FANUC CORPORATION, Minamitsuru-gun, Yamanashi (JP)

(72) Inventors: Tohru Mizuno, Yamanashi (JP); Fumihiro Miura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 2 days.

(21) Appl. No.: 16/159,073

(22) Filed: Oct. 12, 2018

(65) Prior Publication Data

US 2019/0129378 A1    May 2, 2019

(30) Foreign Application Priority Data

Oct. 30, 2017    (JP) .................................. 2017-209782

(51) Int. Cl.
*G05B 19/408*   (2006.01)
*G05B 19/4097*  (2006.01)
*G05B 19/4065*  (2006.01)

(52) U.S. Cl.
CPC ....... *G05B 19/408* (2013.01); *G05B 19/4065* (2013.01); *G05B 19/4097* (2013.01); *G05B 2219/31323* (2013.01)

(58) Field of Classification Search
None
See application file for complete search history.

(56) References Cited

U.S. PATENT DOCUMENTS 10,466,681 B1 *  11/2019  Jones ............... G05B 19/40937

FOREIGN PATENT DOCUMENTS

| JP | 05-261650 | 10/1993 |
|----|-----------|---------|
| JP | 09-272047 | 10/1997 |
| JP | 10-143220 | 5/1998 |
| JP | 2001-005507 | 1/2001 |
| JP | 2001-150300 | 6/2001 |

(Continued)

OTHER PUBLICATIONS

Notification of Reasons for Refusal dated Oct. 8, 2019 in corresponding Japanese Patent Application No. 2017-209782.

(Continued)

*Primary Examiner* — Sean Shechtman
(74) *Attorney, Agent, or Firm* — Wenderoth, Lind & Ponack, L.L.P.

(57) ABSTRACT

To more effectively utilize data related to machining by a machine tool. An integrated machining system includes: a database that stores, as hierarchized structured data, production data related to steps from design until machining, including data of machining commands to be executed by a machine tool, and data of machining history corresponding to the data of machining commands; and a production data management device that includes a provided information generation unit that generates provided information to be provided externally, by way of acquiring at least either of the data of machining commands and the data of machining history from the database, and referencing a hierarchized structure to acquire elements of data related to specific information.

7 Claims, 11 Drawing Sheets

(56) References Cited

FOREIGN PATENT DOCUMENTS

| JP | 2001-222305 | 8/2001 |
| JP | 2001-282346 | 10/2001 |
| JP | 2002-351526 | 12/2002 |
| JP | 2006-107233 | 4/2006 |

OTHER PUBLICATIONS

Notification of Reasons for Refusal dated Jan. 8, 2020 in corresponding Japanese Patent Application No. 2017-209782.

* cited by examiner

INTEGRATED MACHINING SYSTEM, INTEGRATED MACHINING METHOD AND NON-TRANSITORY COMPUTER READABLE MEDIUM ENCODED WITH PROGRAM

This application is based on and claims the benefit of priority from Japanese Patent Application No. 2017-209782, filed on 30 Oct. 2017, the content of which is incorporated herein by reference.

BACKGROUND OF THE INVENTION

Field of the Invention

The present invention relates to an integrated machining system, an integrated machining method and a non-transitory computer readable medium encoded with a program.

Related Art

Conventionally, in a production process by a machine tool, various products are produced by a machine tool executing machining based on machining commands representing machining contents such as the machined shape, tool used or machining conditions. In addition, the machining commands and history of machining by the machine tool are recorded in a database, and are used in post verification, etc. It should be noted that this type of technology is described in Patent Document 1, for example.

Patent Document 1: Japanese Unexamined Patent Application, Publication No. 2006-107233

SUMMARY OF THE INVENTION

However, in the conventional technology, for individual products, although machining commands and the history of machining by the machine tool recorded in the database, the mode of usage of the recorded history has been limited. In other words, in the conventional technology, upon effectively using the data related to machining a machine tool, there has been margin for improvement.

The present invention has an object of more effectively using data related to machining by a machine tool.

An integrated machining system (for example, the integrated machining system S described later) according to a first aspect of the present invention includes:
a database (for example, the shared database 1A described later) that stores, as hierarchized structured data, production data related to steps from design until machining, including data of machining commands to be executed by a machine tool, and data of machining history corresponding to the data of machining commands; and
a production data management device (for example, the production data management device 1 described later) that includes a provided information generation unit (for example, the rule determination unit 11h described later) that generates provided information to be provided externally, by way of acquiring at least either of the data of machining commands and the data of machining history from the database (1A), and referencing a hierarchized structure to acquire elements of data related to specific information.

According to a second aspect of the present invention, the integrated machining system as described in the first aspect may further include: a CAD system (for example, the CAD system 2 described later), a CAM system (for example, the CAM system 3 described later) and a CNC machine tool (for example, the CNC machine tool 4 described later).

According to a third aspect of the present invention, in the integrated machining system as described in the first or second aspect, the provided information generation unit may provide the provided information externally via an application program executed in the production data management device.

According to a fourth aspect of the present invention, in the integrated machining system as described in any one of the first to third aspects, time information of each device included in the integrated machining system may be synchronized.

According to a fifth aspect of the present invention, in the integrated machining system as described in any one of the first to fourth aspects, the provided information generation unit may provide, as the provided information, at least any of machining technique information which represents a specific machining result, information representing an indicator of tool replacement, and information related to machining time.

In addition, an integrated machining method according to a sixth aspect of the present invention includes:
a provided information generation step of generating provided information to be provided externally, by acquiring, from a database that, as hierarchized structured data, stores production data related to steps from design until machining including data of machining commands to be executed by a machine tool and data of machining history corresponding to the data of machining commands, at least either of the data of machining commands and the data of machining history, and referencing a hierarchized structure to acquire an element of data related to specific information.

In addition, a non-transitory computer readable medium encoded with a program according to a seventh aspect of the present invention causes a computer to execute a provided information generation function comprising: generating provided information to be provided externally, by acquiring, from a database that, as hierarchized structured data, stores production data related to steps from design until machining including data of machining commands to be executed by a machine tool and data of machining history corresponding to the data of machining commands, at least either of the data of machining commands and the data of machining history, and referencing a hierarchized structure to acquire an element of data related to specific information.

According to the present invention, it is possible to more effectively use data related to machining by a machine tool.

DETAILED DESCRIPTION OF THE INVENTION

Hereinafter, an embodiment of the present invention will be explained by referencing the drawings.

Configuration

Figure 1:
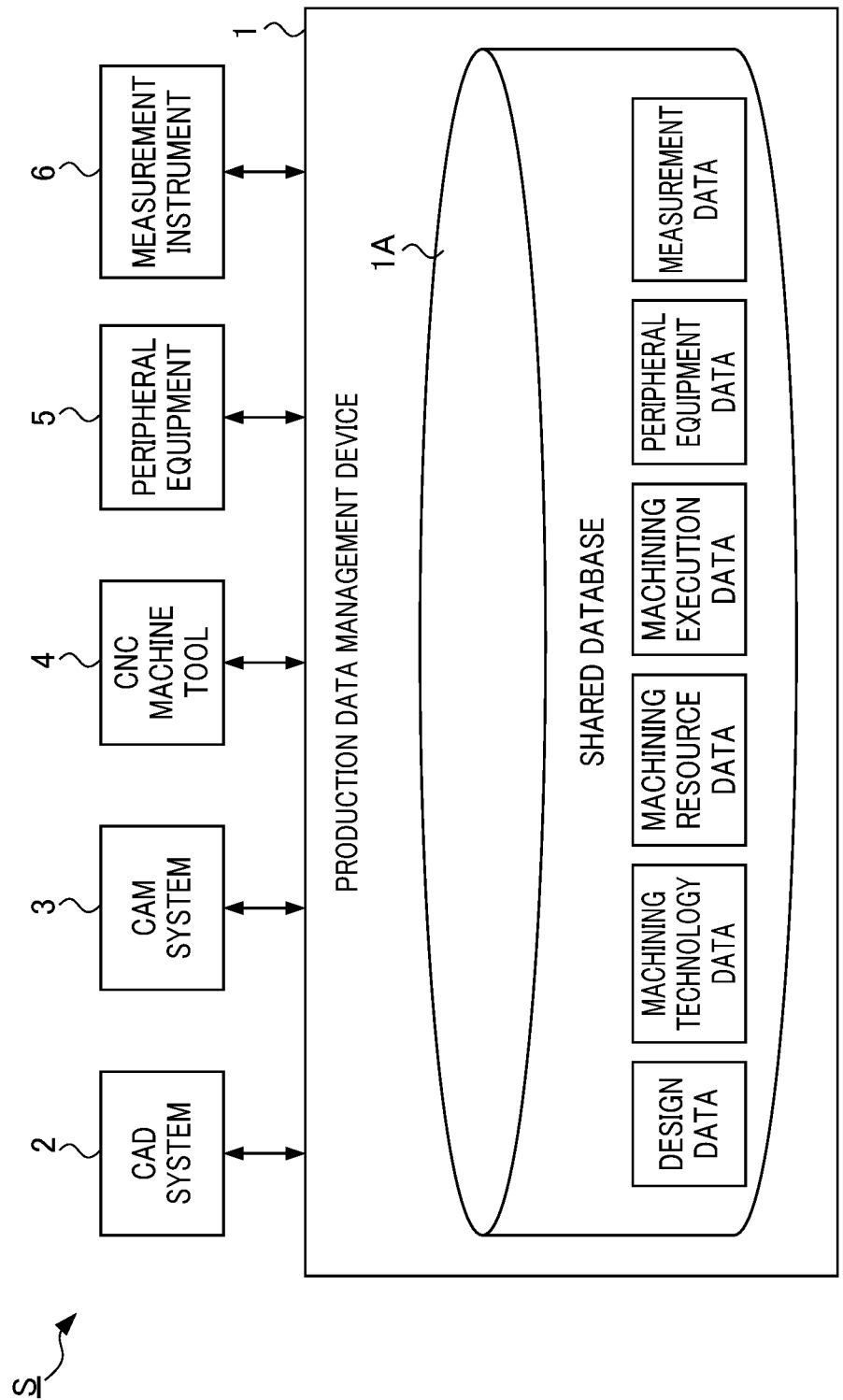
FIG. 1 is a schematic diagram showing the system configuration of an integrated machining system according to an embodiment of the present invention.

FIG. 1 is a schematic diagram showing the system configuration of an integrated machining system S according to an embodiment of the present invention. In the integrated machining system S according to the present embodiment, the machining command data and machining execution data (data of machining history) in the production process are acquired by a production data management device 1, and stored in a shared database 1A. In the present embodiment, each of the machining command data and machining execution data is stored as structured data having a layered structure, and the machining command data and machining execution data which is the execution result thereof are stored to be associated. In addition, the machining command data and machining execution data related to various products are stored in the shared database 1A. In other words, the integrated machining system S constitutes an integrated platform of data related to machining. Then, in the case of the user demanding specific information (for example, replacement lifespan of tools of specific types), the specific information demanded by the user is generated based on the results of related information in the shared database 1A (for example, information related to usage results of the same type of tool) being extracted and analyzed, and is then provided to the user. Therefore, according to the integrated machining system S related to the present embodiment, it is possible to more effectively use the data related to machining by a machine tool which is numerically controlled.

As shown in FIG. 1, the integrated machining system S is configured to include: a production data management device 1; CAD (Computer Aided Design) system 2; CAM (Computer Aided Manufacturing) system 3; CNC (Computerized Numerical Control) machine tool 4; peripheral equipment 5; and measurement instrument 6. In addition, the production data management device 1, CAD system 2, CAM system 3, CNC machine tool 4 and measurement instrument 6 are configured to be communicable by a network such as a wired or wireless LAN, or a communication cable such as a USB (Universal Serial Bus) cable. It should be noted that the time information of each device constituting the integrated machining system S is synchronized, and the time stamps of data generated are made based on the reference of unified time.

The production data management device 1 includes the shared database (shared DB) 1A for integrating and storing respective data of design data, machining technique information data, machining command data, machining resource data, machining execution data, data of peripheral equipment, and measured data (hereinafter there are collectively called "production data"). It should be noted that, in the present embodiment, the production data collected for a case of processing being performed other than by the production data management device 1 is stored in the shared DB 1A, in addition to a case of processing being performed in the production data management device 1.

The design data includes product shape data and process design data. The product shape data is 2D or 3D CAD data generated in the CAD system 3, and the process design data is CAM data in which the machining method, machining sequence or the like generated in the CAM system is defined. The machining technique information data is data of contents produced by the user or production data management device 1 determining as being an execution condition for more appropriate machining (machining conditions of CNC machine tool 4, machining time or machining route, etc.), based on the machining command data, and machining execution data corresponding thereto.

The machining command data is data consisting of a set of working steps representing the basic pattern of machining work. In the present embodiment, the machining command data is written as structured data having a hierarchical structure. The machining resource data is data containing data of the CNC machine tool 4 performing the machining, and the data of the tool used in machining. The data of usage recording of each tool and data of usage result information are included in the machining resource data. The machining execution data is data representing the history of machining executed based on the machining command data. In the present embodiment, the machining execution data is written as structured data having a hierarchical structure corresponding to the machining command data. The data of peripheral equipment is data of peripheral equipment used in the machining, such as a vice, chuck or tooling. The measurement data is data measured by the measurement instruments installed as external equipment of the CNC machine tool 4, such as a temperature sensor or sizer.

In addition, the production data management device 1 extracts related information. (e.g., usage recording of same type of tools) in the shared database 1A in the case of the user demanding specific information (e.g., replacement lifespan of specific type of tool), and based on the results of analyzing the machining command data and corresponding machining execution data (usage result information described later), causes the machined shape, used tool, cutting conditions, machining state, measurement data or the like to be reflected, and forms specific information demanded by the user.

Figure 2:
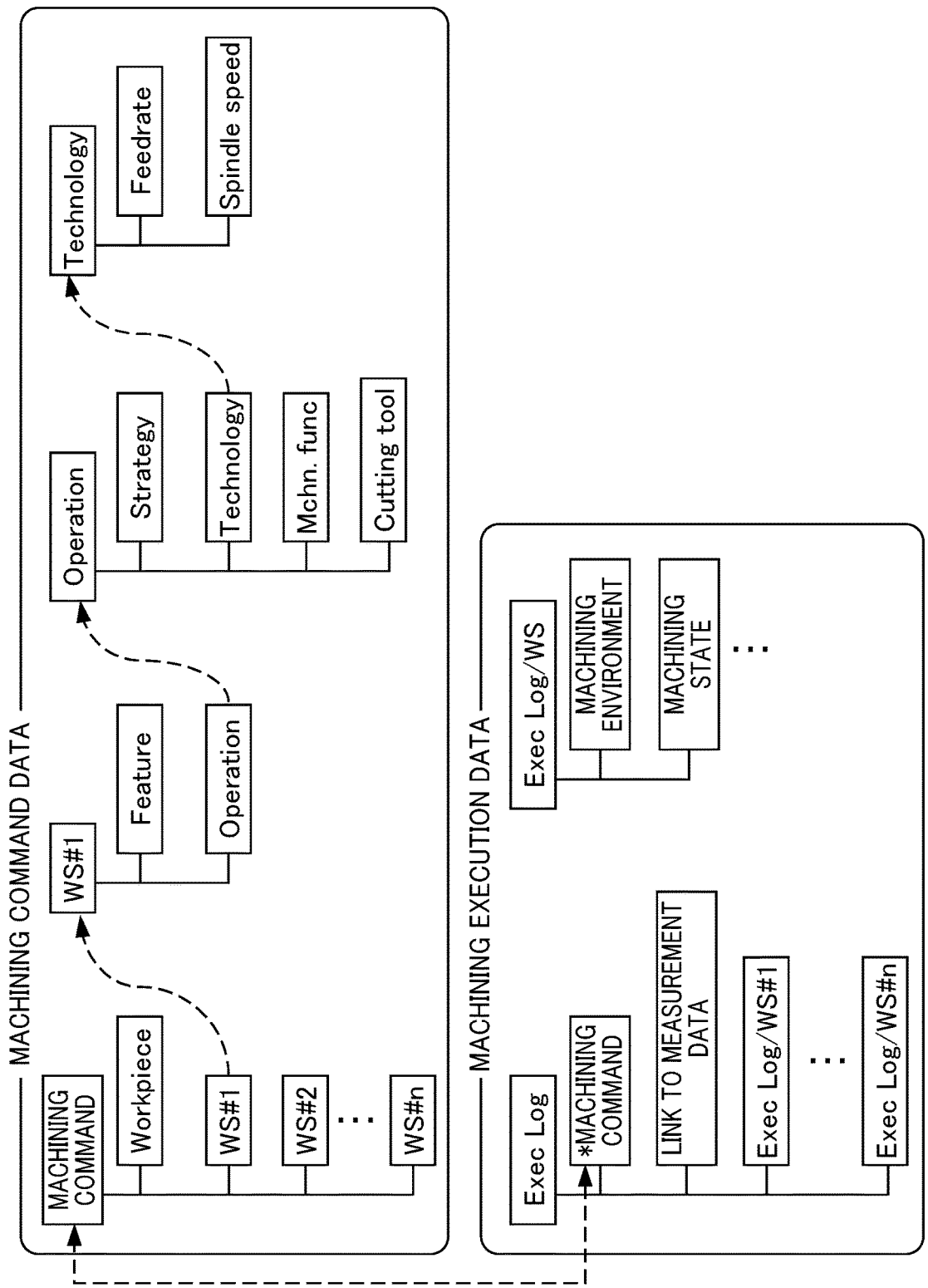
FIG. 2 is a schematic diagram showing a data structure of machining command data and machining execution data.

FIG. 2 a schematic diagram showing the data structure of machining command data and machining execution data. It should be rioted that FIG. 2 shows an example of the concept of machining command data and machining execution data, and the specific contents of machining command data and machining execution data (mode of hierarchization, items of data, etc.) assume various different types depending on the actual machining contents.

As shown in FIG. 2, the data of a workpiece (Workpiece) representing the machining target, and the data of working steps (WS) representing the basic pattern (machining units) of $1^{st}$ to $n^{th}$ machining work (n is a natural number) in machining order are included in the machining command data. It should be noted that the ID identifying the machining command data is attached to the machining command data. In addition, in the data of each working step, data of a feature (Feature) representing the machined shape such as a pocket, and data of an operation (Operation) representing a machining method are included.

In addition, the data of operations includes: data of a strategy (Strategy) representing the machining strategy (pattern of machining paths); data of technology (Technology) representing the cutting conditions; data of a machine functions (Mchn. func) representing the functions of the CNC machine tool 4 used in machining; and data of the cutting tool (Cutting tool) representing the tool used in machining. Furthermore, the data of technology includes: data of a feed rate (Feedrate) representing the tool feed speed; and data of the spindle speed (Spindle speed) representing the rotating speed of the spindle (spindle rotation).

In addition, as shown in FIG. 2, the machining execution data includes: data of the machining command ID identifying the corresponding machining command data; data of link information indicating a storage area of measurement data produced by measuring the machining results; and data of execution history (Exec Log) representing the history of machining in every working step from $1^{st}$ to $n^{th}$ in machining order. In addition, the data of execution history includes: data representing the machining environment such as temperature; and data representing the machining state such as spindle load.

Figure 3:
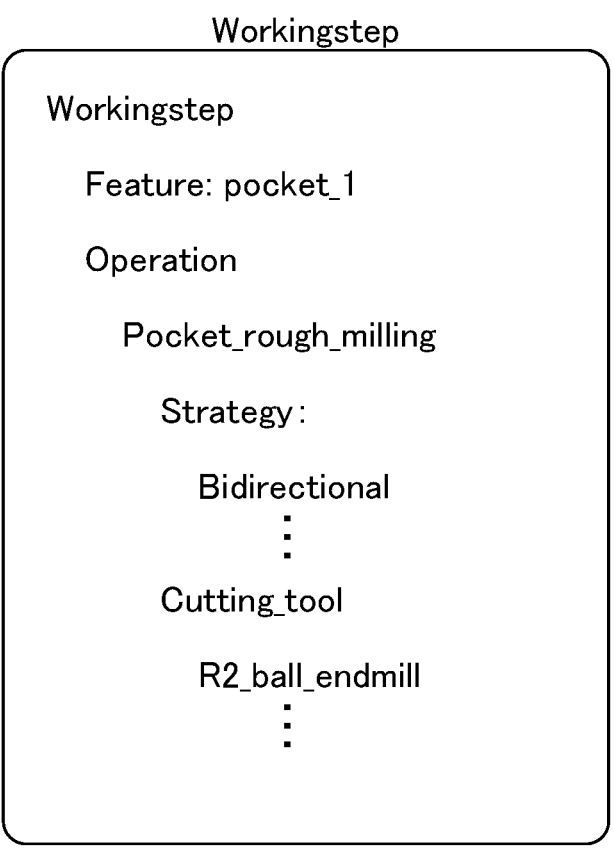
FIG. 3 is a schematic diagram showing an example of data of working steps constituting the machining command data.

FIG. 3 is a schematic diagram showing an example of data of the working steps constituting the machining command data. As shown in FIG. 3, the data of one working step is included heirarchically in the machining command data, and the specific contents are written for the data of features (Feature) representing a machined shape, and data of operations (Operation) representing the machining method.

For example, in FIG. 3, "pocket_1" representing the shape of "Pocket 1" is written as the data of the feature (Feature) representing the machined shape. In addition, as the data of operations (Operation) representing the machining method, "Pocket_rough_milling" representing being "rough machining" is written. In addition, as the data of strategy (Strategy) representing the machining strategy (pattern of machining paths), "Bidirectional" representing that the machining path is a reciprocal path is written. In addition, as the data of the cutting tool (Cutting tool) representing the tool used in machining, "R2_ball_endmill" representing the end mill of a predetermined type is written. By the machining command data being structured in this way, the matter of grasping the flow of machining overall becomes easy compared to a case of the machining command being written in G-code format (non-structured format) simply.

The CAD system 2 generates 2D or 3D CAD data representing the shape of the product, according to the operations of the user. The CAM system 3 generates process design data in which the machining method (type of machining technique used) or machining order (machining route, etc. upon machining a product) for machining the product is defined according to the operations of the user.

The CNC machine tool 4 includes a numerical control device that controls operation by numerical control, and performs machining such as cutting or polishing on the material to become the product, in accordance with the control of the numerical control device. In addition, the CNC machine tool 4 acquires various types of data related to the operating state (data of position and speed of servo, etc.) according to the numerical control device. The peripheral equipment 5 is peripheral equipment used in machining such as a vice, chuck, tooling or the like. The measurement instrument 6 is a measurement instrument that is installed as an external device of the CNC machine tool 4, such as temperature sensors or sizers.

Configuration of Production Data Management Device 1

Figure 4:
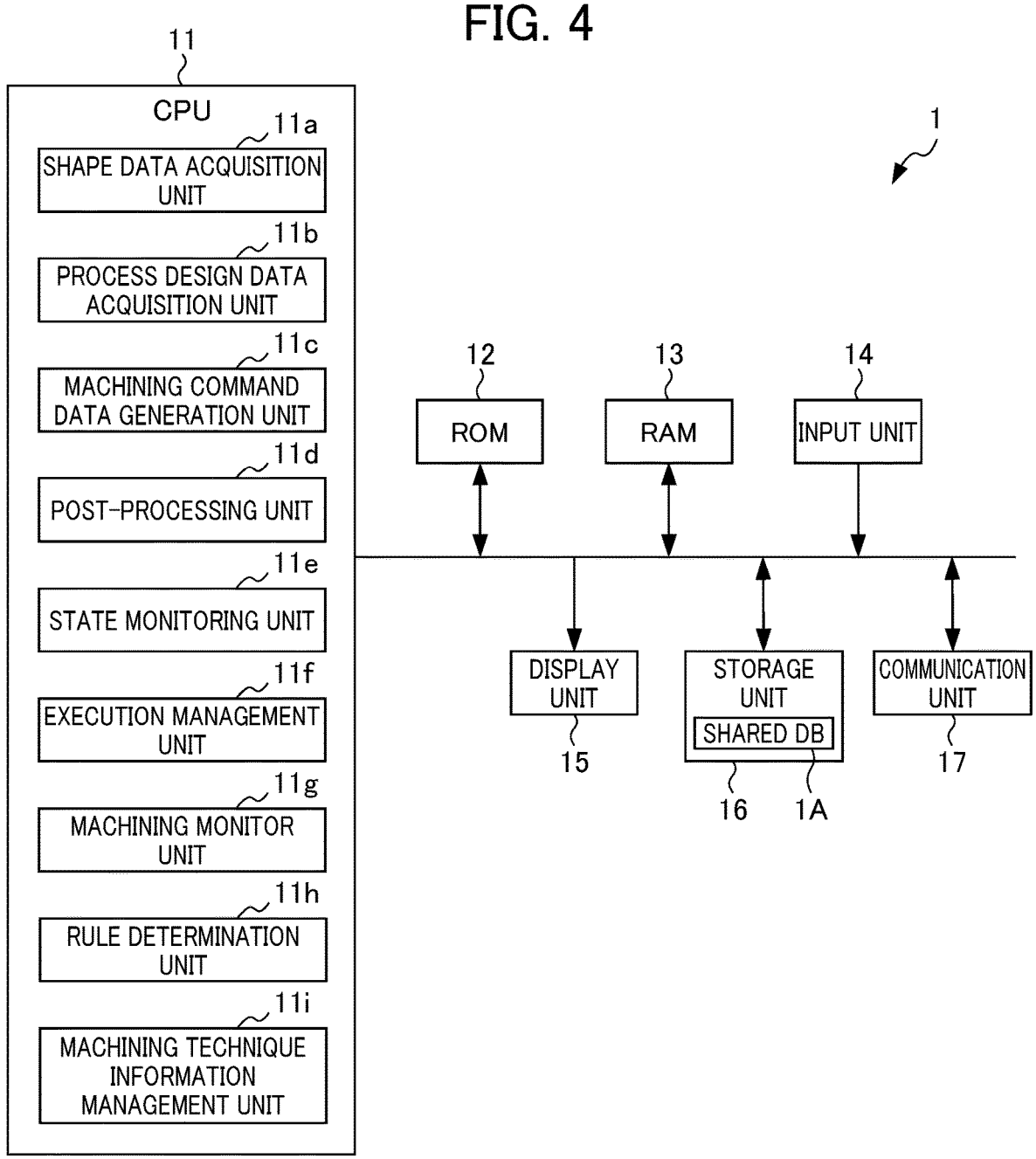
FIG. 4 is a block diagram showing the configuration of a production data management device 1.

Next, the configuration of the production data management device 1 will be explained with the case of supplying information related to replacement rules of a tool as the specific information demanded by the user as an example. FIG. 4 is a block diagram showing the configuration of the production data management device 1. As shown in FIG. 4, the production data management device 1 includes a CPU (Central Processing Unit) 11, ROM 12, RAM 13, input unit 14, display unit 15, storage unit 16, and communication unit 17.

The CPU 11 controls the production data management device 1 overall, by executing various programs stored in the storage unit 16. For example, the CPU 11 executes: programs for processing of monitoring the state of the CNC machine tool 4 (hereinafter referred to as "state monitoring processing"); programs for processing of executing machining of a product (hereinafter referred to as "machining execution processing"); programs for processing of generating usage result information for every tool model number based on the usage recording of tools in the machining resource data (hereinafter referred to as "usage result information generation processing"); and programs for processing of performing determination related to tool replacement rules (replacement indicator) (hereinafter referred to as "replacement rule determination processing").

By executing the programs of state monitoring processing, machining execution processing, usage result information generation processing and replacement rule determination processing, the CPU 11 forms, as functional configurations, a shape data acquisition unit 11a, process design data acquisition unit 11b, machining command data generation unit 11c, post-processing unit 11d, state monitoring unit 11e, execution management unit 11f, machining monitor unit 11g, rule determination unit 11h, and machining technique information management unit 11i.

The shape data acquisition unit 11a acquires 2D or 3D CAD data (product shape data) representing the shape of the product generated in the CAD system 2, and stores in the shared DB 1A. The process design data acquisition unit 11b acquires the process design data generated in the CAM system, and stores in the shared DB 1A. It should be noted that the process design data includes CL (Cutting Line) data indicating the machining route upon machining the product.

The machining command data generation unit 11c generates machining command data including the working steps representing the basic pattern of the machining work, based on the process design data. As the basic pattern represented by the working steps, for example, it is possible to define the respective patterns such as end milling of pocket, pocket shape, pattern of machining paths, radial slitting, axial slitting, feed rate, spindle rotation, approach pattern, and retract pattern.

The post processing unit 11d executes post-processing processing based on the machining command data, and generates machining paths on the machine coordinate system, using an interpreter according to the numerical control device of the CNC machine tool 4. Then, the post-processing unit 11d outputs the machining command data representing the machining paths on the machine coordinate system and data of CNC parameters (hereinafter referred to as "numerical control command data" as appropriate) to the numerical control device of the CNC machine tool 4.

The state monitoring unit 11e monitors the state of the CNC machine tool 4 controlled by the numerical control device, by executing state monitoring processing. In addition, the state monitoring unit 11e collects usage recording of a defined tool (i.e. usage recording of replaced tool) by executing usage result information generation processing, and generates usage result information for every model number of tool.

Figure 5:
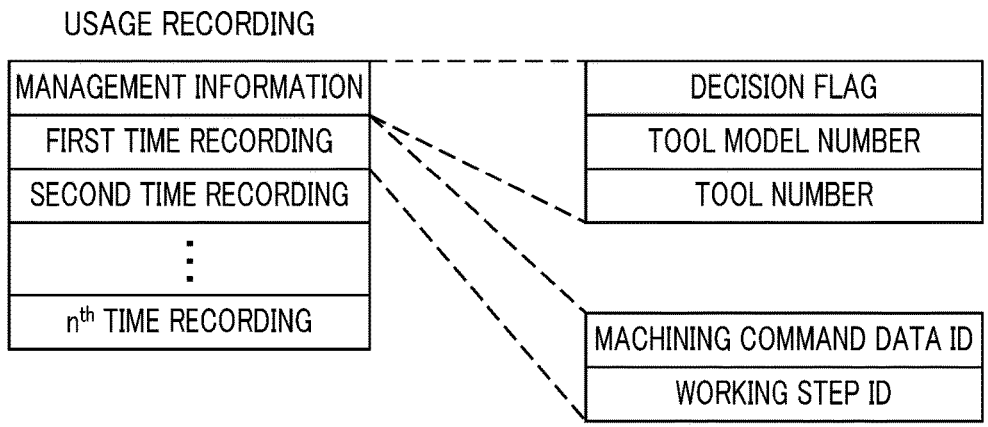
FIG. 5 is a schematic diagram showing a specific example of data of usage recording of a tool included in the machining resource data.

Herein, data of usage recording of tools included in the machining resource data and data of the usage result information for every model number of tool will be specifically explained. FIG. 5 is a schematic diagram showing a specific example of data of the tool usage recordings included in the machining resource data. As shown in FIG. 5, the data of tool usage recordings includes management information, and the recording of machining from $1^{st}$ to $n^{th}$ times. The management information includes: a decision flag indicating whether or not data of tool usage recordings is decided (0 in the case of not being decided, and 1 in the case of being decided), tool model number identifying the type of tool, and a tool number identifying the individual tool installed in the CNC machine tool 4. In addition, recording of machining from a $1^{st}$ time to $n^{th}$ time includes the ID of machining command data and the ID of working steps.

Figure 6:
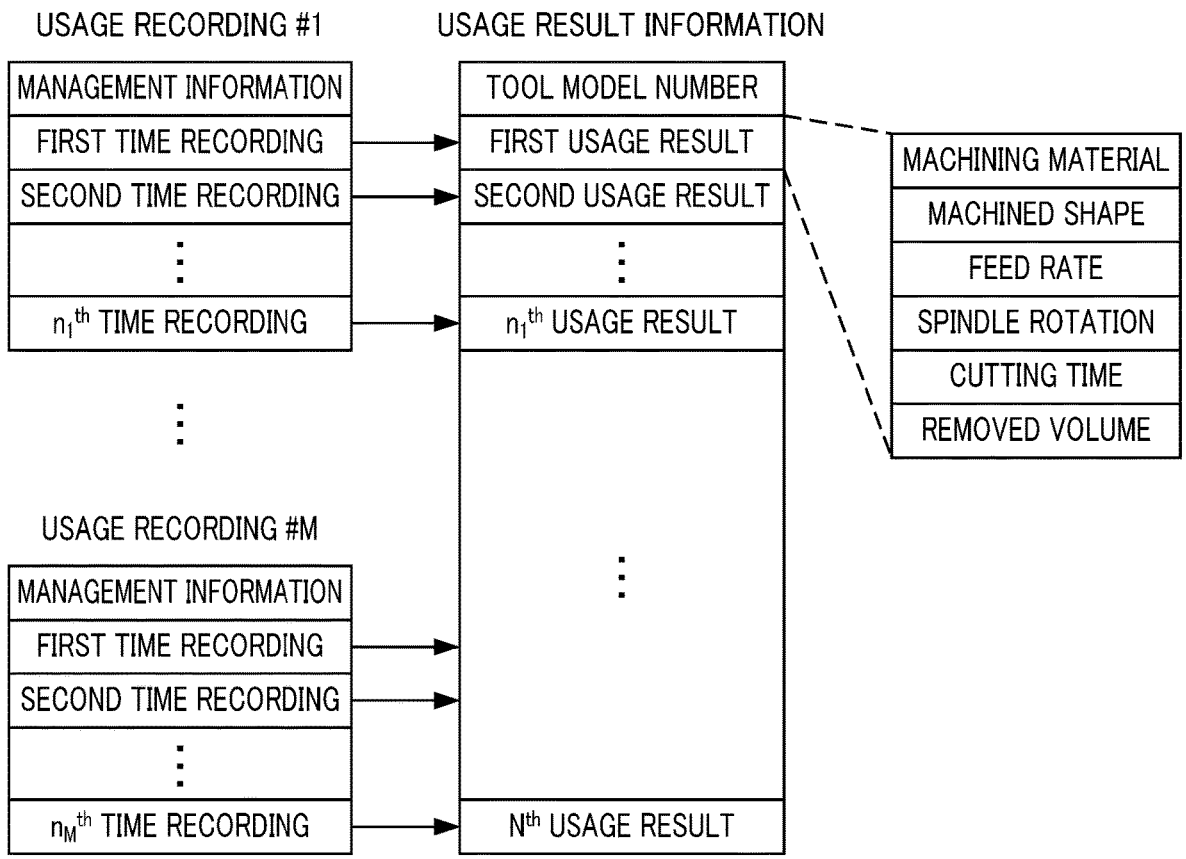
FIG. 6 is a schematic diagram showing a specific example of data of usage result information included in the machining resource data.

In addition, FIG. 6 is a schematic diagram showing a specific example of data of usage result information included in the machining resource data. It should be noted that n, N and M in FIG. 6 are natural numbers. As shown in FIG. 6, the usage result information includes: tool model number, and $1^{st}$ to $n^{th}$ usage results extracted from the data of the usage records of each tool with matching tool model number. In addition, each usage result includes: specific contents (machined material, machined shape, feed rate, spindle rotation, cutting time, removed volume, etc.) of recordings of tools specified by tracing back the hierarchy of machining command data.

Referring back to FIG. 4, the execution management unit 11f manages the machining execution processing (machining processing based on machining command data) that executes the machining of the product. For example, the execution management unit 11f instructs the start of machining based on the machining path generated by the post-processing unit 11d, in response to receiving a signal indicating that standby of the CNC machine tool 4 has completed from the numerical control device of the CNC machine tool 4, and displays the end of machining, in response to receiving a signal indicating that machining of the CNC machine tool 4 has ended from the numerical control device of the CNC machine tool 4. In addition, the execution management unit 11f acquires machining execution data representing the history of machining executed based on the machining command data in the machining execution processing, and successively stores in the shared DB 1A.

Figure 7:
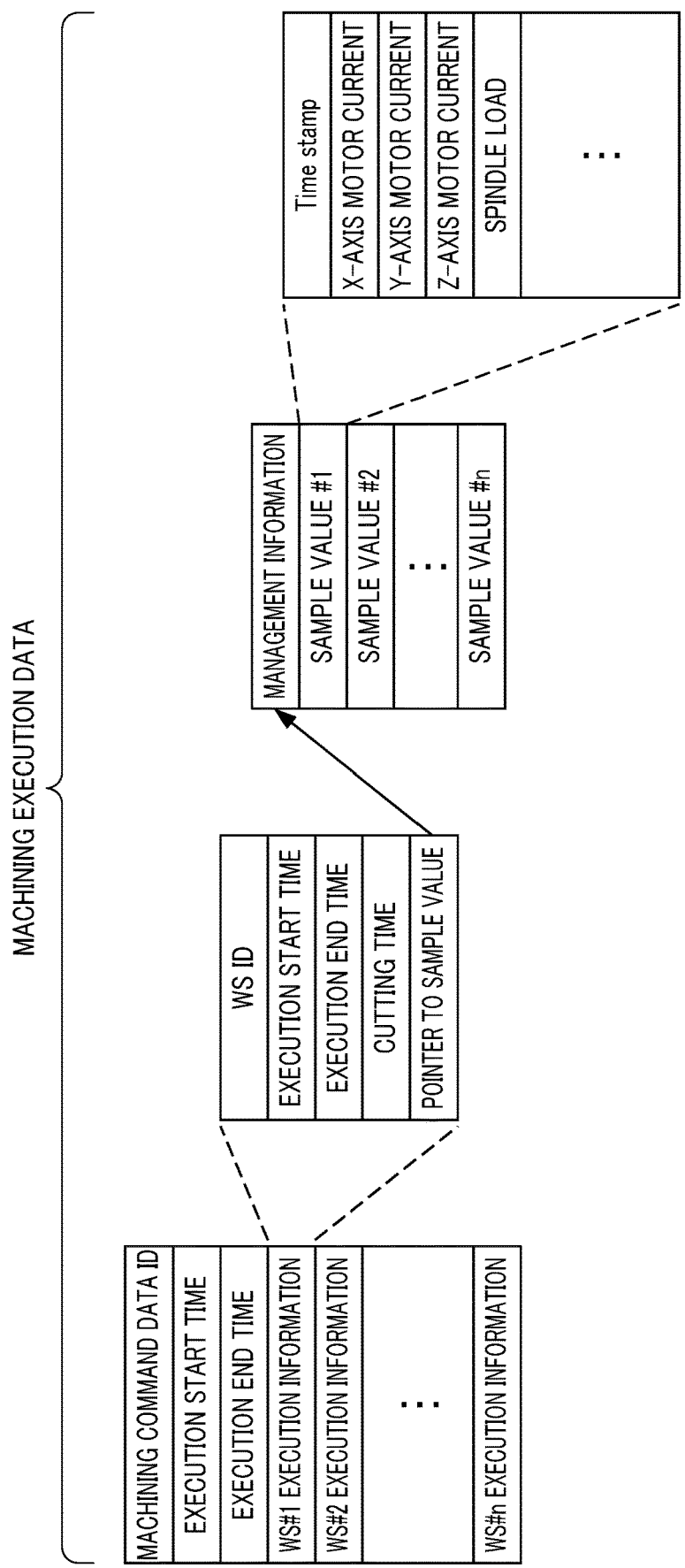
FIG. 7 is a schematic diagram showing a specific example of machining execution data.

FIG. 7 is a schematic diagram showing a specific example of machining execution data. As shown in FIG. 7, the machining execution data includes: the ID of corresponding machining command data; execution start time of machining; execution end time of machining; and execution information of working steps from $1^{st}$ time to $n^{th}$ time.

The execution information of working steps includes: the ID of working steps; execution start time of working steps; execution end time of working steps; cutting time; and pointer to sample value. The data of sample values indicated by the pointer to the sample value includes management information containing the ID of machining command data and the ID of the working step; and $1^{st}$ to $n^{th}$ sample values. The respective sample values include various data containing: a time stamp (Time stamp); X-axis motor current; Y-axis motor current; Z-axis motor current; and spindle load, for example.

Referring back to FIG. 4, the machining monitor unit 11g acquires, from the numerical control device of the CNC machine tool 4, a signal indicating the state of machining execution processing executed based on the tool path generated by the post-processing unit 11d (for example, machining date, machined shape, demanded precision, machining conditions of CNC machine tool 4, machining tame, machining route, servo value, examination results, etc.), and stores as machining execution data in the shared DB 1A.

The rule determination unit 11h performs the determination related to the replacement rule of tools and output of the determination results (provision of information to user), by executing the replacement tool determination processing. For example, the rule determination unit 11h calculates a tool consumption rate representing the tool consumption state based on the machining execution data, and in the case of the tool consumption rate reaching a reference value for replacement, determines as being a tool replacement period, and outputs the determination result. The tool consumption rate, for example, is calculated by adding a value according to the tool usage state in the case of defining the new article as 0. It should be noted that the replacement tool determination processing executed in the rule determination unit 11h is an example of an application program that provides various information, based on the machining command data and machining execution data stored in the shared DB 1A. The application program executed by the rule determination unit 11h is able to appropriately generate or input according to the type of information demanded by the user, and includes programs performing determination related to the appropriateness of machining conditions, for example, in addition to programs performing determination related to tool replacement rules as mentioned above.

In the present embodiment, in the case of calculating the tool consumption rate, the replacement period (i.e. tool lifespan) is determined to conform to the lifespan equation of Taylor (e.g., refer to machining technique database site <http://www.monozukuri.org/mono/db-dmrc/cutting/basic/tool_life/life_eq.htm>). In other words, there exist wear type and defect type among types of tool damage, and most of the tool lifespan depends on the damage of wear type. The extent of wear-type damage is decided by the depth KT of crater expressed in the cutting face and the size of the width VB of flank wear occurring in the flank. It should be noted that the determination criterion for lifespan related to the depth KT of the crater expressed in the cutting face and size of the width VB of the flank wear occurring in the flank is decided specifically in the standard (JISB4011), and the present embodiment defines the overall cutting time until reaching this criterion as the lifespan time.

More specifically, there shall be a relationship of formula (1) between the cutting speed V and lifespan time T by the experiments by Taylor, and is called the lifespan equation.

$$VT^m = C \qquad (1)$$

Herein, m and C are constants decided by combinations of tool and workplace.

In addition, the cutting speed V (mm/min) is obtained by formula (2) from the tool diameter D (mm) and spindle revolution speed R (min).

$$V = nDR \qquad (2)$$

If assuming that the progression of wear is linear, i.e. wear amount is proportional to the cutting time, the tool consumption rate when machining for time T1 at the cutting speed V can be calculated as (T1/T)×100(%). It should be noted that T is the lifespan. Then, when the tool consumption rate reaches 100(%), it is possible to determine as being the lifespan on this tool. In addition, by applying the corresponding V, m, C to formula (1) and formula (2), for machining at different cutting speeds and different work materials, it is possible to calculate the tool consumption rate; therefore, the tool consumption rate can be cumulatively calculated for one tool. In the present embodiment, the corresponding relationship between the combination of tool and work material, with m and C is acquired beforehand from the machining execution data, and is a state that can always be referenced.

By calculating the tool consumption rate collectively, and replacing the tool at the moment when the tool consumption rate reaches 100(%) in this way, it is possible to more rationally estimate the timing of tool replacement compared to conventionally. It should be noted that it is possible to decide a criterion (more rigorous criterion, etc.) different from the criterion decided in the standard. (JISB4011) as the reference for tool replacement.

The machining technique information management unit 11i receives input of the contents (machining technique information data) determined by the user or production data management device 1 as being implementation conditions for more appropriate machining (machining conditions, machining time, machining route, etc. of CNC machine tool 4), based machining command data and machining execution data corresponding thereto, and stores in the shared DE 1A. In other words, the machining technique information data is data serving as an element for correcting the machining command data, in the case of execution of the same type of machining command data being instructed the next time and after.

Referring back to FIG. 4, various system programs for controlling the production data management device 1 are written in advance in the ROM 12. The RAM 13 is configured by semiconductor memory such as DRAM (Dynamic Random Access Memory), and stores the data generated upon the CPU 11 executing various processing. The input unit 14 is configured by an input device such as a keyboard, mouse or the like, and receives inputs of various information to the production data management device 1 by the user.

The display unit 15 is configured by a display device such as LCD (Liquid Crystal Display), and displays various processing results of the production data management device 1. The storage unit 16 is configured by a nonvolatile storage device such as a hard disk or flash memory, and stores programs, etc. for production processing and production data synchronization processing. In addition, the shared DB 1A is stored in the storage unit 16. In the present embodiment, the shared DB 1A is configured by a relational database, and stores and manages respective production data of products serving as the machining target to be associated. The communication unit 17 includes a communication interface that performs communication processing based on a predetermined communication standard, such as wired or wireless LAN and USB, and controls the communication performed by the production data management device 1 with other devices.

Association of Information

Next, a specific state of association of information handled in the production data management device 1 will be explained. As shown in FIG. 3 and FIG. 7, since the machining command data and machining execution data are hierarchical structures, for example, in the case of adding data to the usage recording, or the like, by tracing back to the working step, operation and cutting tool from the ID of the machining command data during the current execution, upon specifying the tool model number, it is possible to read out the tool model number designated as an attribute of the cutting tool. It is thereby possible to specify the tool model number.

In addition, upon specifying the tool number, it is possible to specify by reading out the tool number being used in the current working step. In addition, in the case of associating the machining execution data with the machining command data and working step, upon recording the machining execution data in the machining execution processing, the ID of the machining command data and ID of the working step being executed are grasped. For this reason, association is possible by recording, as management information of the machining execution data, the ID of this machining command data and ID of working step.

In addition, for the respective items in the usage result information, for example, it is possible to specify as follows. In other words, regarding the machined material, it is possible to trace back the machining command data and workpiece from the machining command ID, and specify the machined material from attributes of the workpiece. Regarding the machined shape, it is possible to trace back the feature from the ID of the working step. Regarding the feed rate, it is possible to specify by tracing back the operation, technology and feed rate, from the ID of working step.

Regarding spindle rotation, it is possible to specify by tracing back the operation, technology and spindle speed from the ID of working step. Regarding the cutting time, it is possible to rear out the cutting time recorded in the machining execution data. Regarding the removed volume, a cutting amount dr in the radial direction and a cutting amount da in the axial direction are acquired from data of a strategy in the operation of the working step. In addition, the cutting time t recorded in the machining execution data is read out. Then, the feedrate f is read out from the data of technology in the working step, and by performing calculation of Removal volume=$dr \times da \times f \times t$, it is possible to specify the removed volume.

Operation

Next, operation of the integrated machining system S will be explained.

State Monitoring Processing

Figure 8:
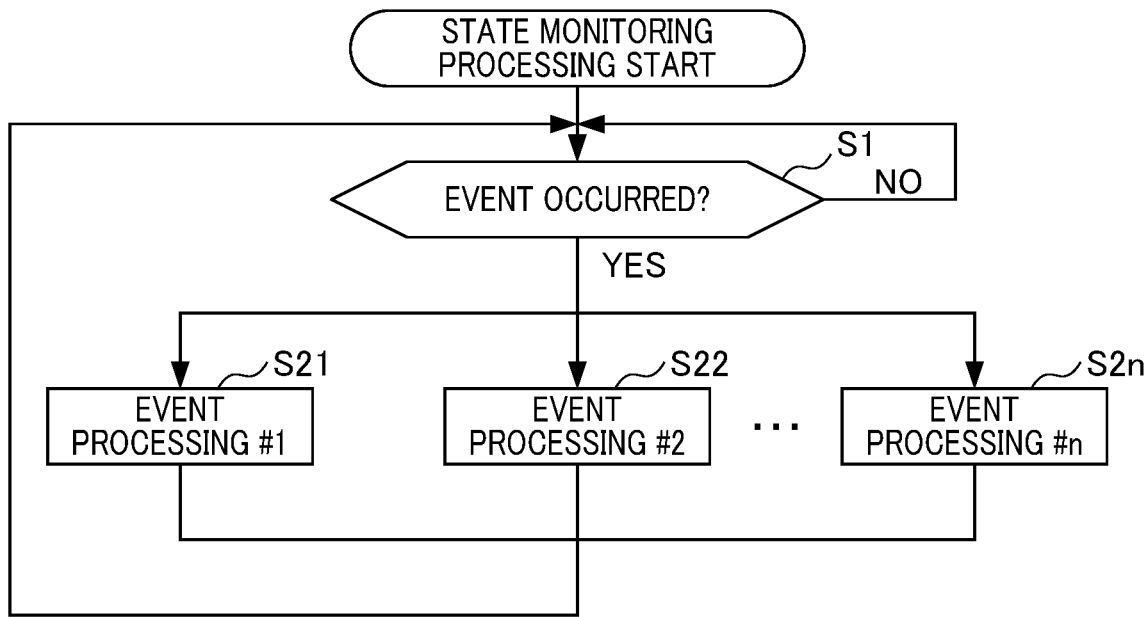
FIG. 8 is a flowchart for explaining the flow of state monitoring processing executed by the production data management device.

FIG. 8 is a flowchart for explaining the flow of state monitoring processing executed by the production data management device 1. The state monitoring processing is started by an instruction for launching state monitoring processing being inputted via the input unit 14. In Step S1, the state monitoring unit 11e performs determination of whether an event is occurring in the CNC machine tool 4. Event includes various phenomena in which the state monitoring unit 11e defines a monitoring target as the state of the CNC machine tool and, for example, tool replacement, etc. can be detected as an event. In the case of an event not occurring in the CNC machine tool 4, it is determined as NO in Step S1, and the processing of Step S1 is repeated. On the other hand, in the case of an event occurring in the CNC machine tool 4, it is determined as YES in Step S1, and the processing advances to processing corresponding to the occurred event (any of Step S21 to Step S2n (n is a natural number)). In Step S21 to Step S2n, the state monitoring unit 11e executes event processing corresponding to the detected event. After Step S21 to Step S2n, the processing advances to Step S1.

Event Processing

Figure 9:
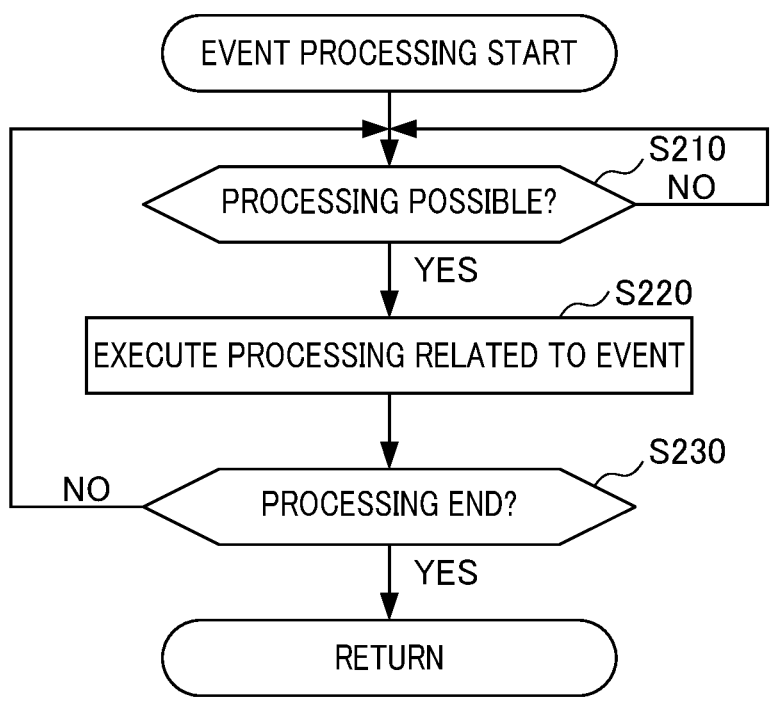
FIG. 9 a flowchart for explaining the flow of event processing, exemplifying the replacement of a tool.

FIG. 9 is a flowchart for explaining the flow of event processing exemplifying tool replacement. The event processing is registered in advance as processing corresponding to the event of the monitoring target in the state monitoring processing. In Step S210, the state monitoring unit 11e performs determination of whether or not being a state in which the processing related to the occurred event is possible. Whether or not the processing related to the occurred event is possible, in the case of the event being tool replacement, for example, can be determined according to whether or not tool replacement work has completed (mounting of tool has completed). In the case of not being a state in which the processing related to the occurred state is possible, it is determined as NO in Step S210, and the processing of Step S210 is repeated. On the other hand, in the case of being a state in which the processing related to the occurred event is possible, it is determined as YES in Step S210, and the processing advances to Step S220. In Step S220, the state monitoring unit 11e executes the processing related to the occurred event. As the processing related to the occurred event, for example, processing of registering data related to the replaced tool (tool model number or tool number), and resetting the data (set the tool consumption rate to 0(%) in the shared DB 1A is included, for example. In Step S230, the state monitoring unit 11e performs determination as to whether or not the processing related to the occurred event has ended. In the case of the processing related to the occurred event not having ended, it is determined as NO in Step S230, and the processing advances to Step S210. On the other hand, in the case of being a state in which the processing related to the occurred event is possible, it is determined as YES in Step S230, and the processing returns to the state monitoring processing.

Usage Recording Decision Processing

Figure 10:
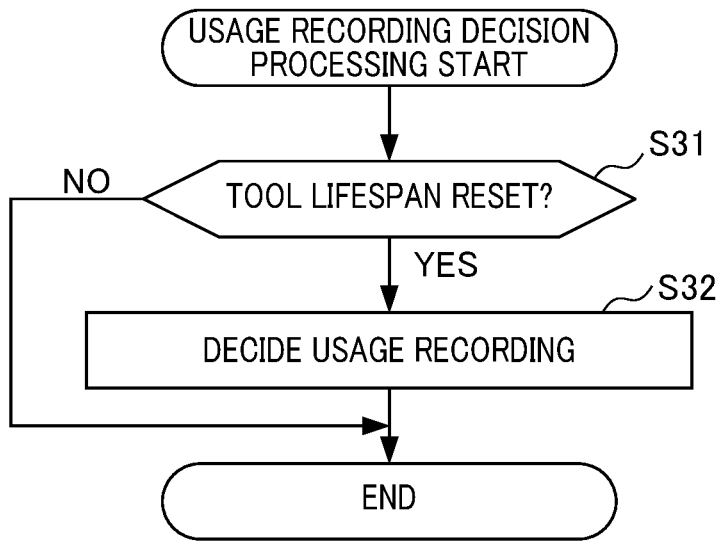
FIG. 10 is a flowchart for explaining the flow of usage recording decision processing read out at a predetermined timing in the state monitoring process.

FIG. 10 is a flowchart for explaining the flow of usage recording decision processing which is called at a predetermined timing in the state monitoring processing, for the case of exemplifying tool replacement. It should be noted that the usage recording decision processing is called at a timing set in advance, such as the end timing of event processing of the state monitoring processing, or at one timing in a predetermined loop. In Step S31, the state monitoring unit 11e performs determination as to whether or not the tool lifespan was reset (i.e. tool consumption rate set to 0(%). Tool lifespan was reset, in other words, indicates the matter of the tool having been replaced. In the case of the tool lifespan not being reset, it is determined as NO in Step S31, and the usage recording decision processing comes to an end. On the other hand, in the case of the tool lifespan having been reset, it is determined as YES in Step S31, and the processing advances to Step S32. In Step S32, the state monitoring unit 11e decides the data of usage recording related to the tool prior to replacement, and sets as a state not overwritten. As the state not overwritten, for example, the matter of movement to a predetermined storage area in the storage unit 16 and making the setting of write protect, etc. is possible. After Step S32, the usage recording decision processing comes to an end.

Machining Execution Processing

Figure 11:
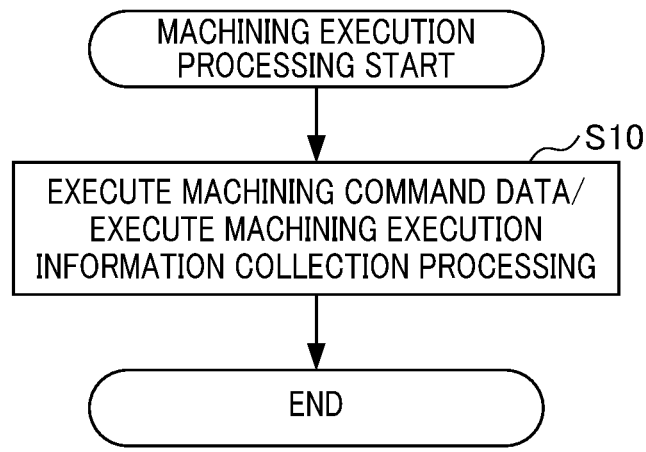
FIG. 11 is a flowchart for explaining the flow of machining execution processing executed by the production data management device.

FIG. 11 is a flowchart for explaining the flow of machining execution processing which is executed by the production data management device 1. The machining execution processing is started by an instruction for launching the machining execution processing being inputted via the input unit 14. In Step S10, the execution management unit 11f executes machining command data, as well as executing processing for collecting and recording machining execution information (hereinafter referred to as "machining execution information collection processing"). After Step S10, the machining execution processing comes to an end.

Machining Execution Information Collection Processing

Figure 12:
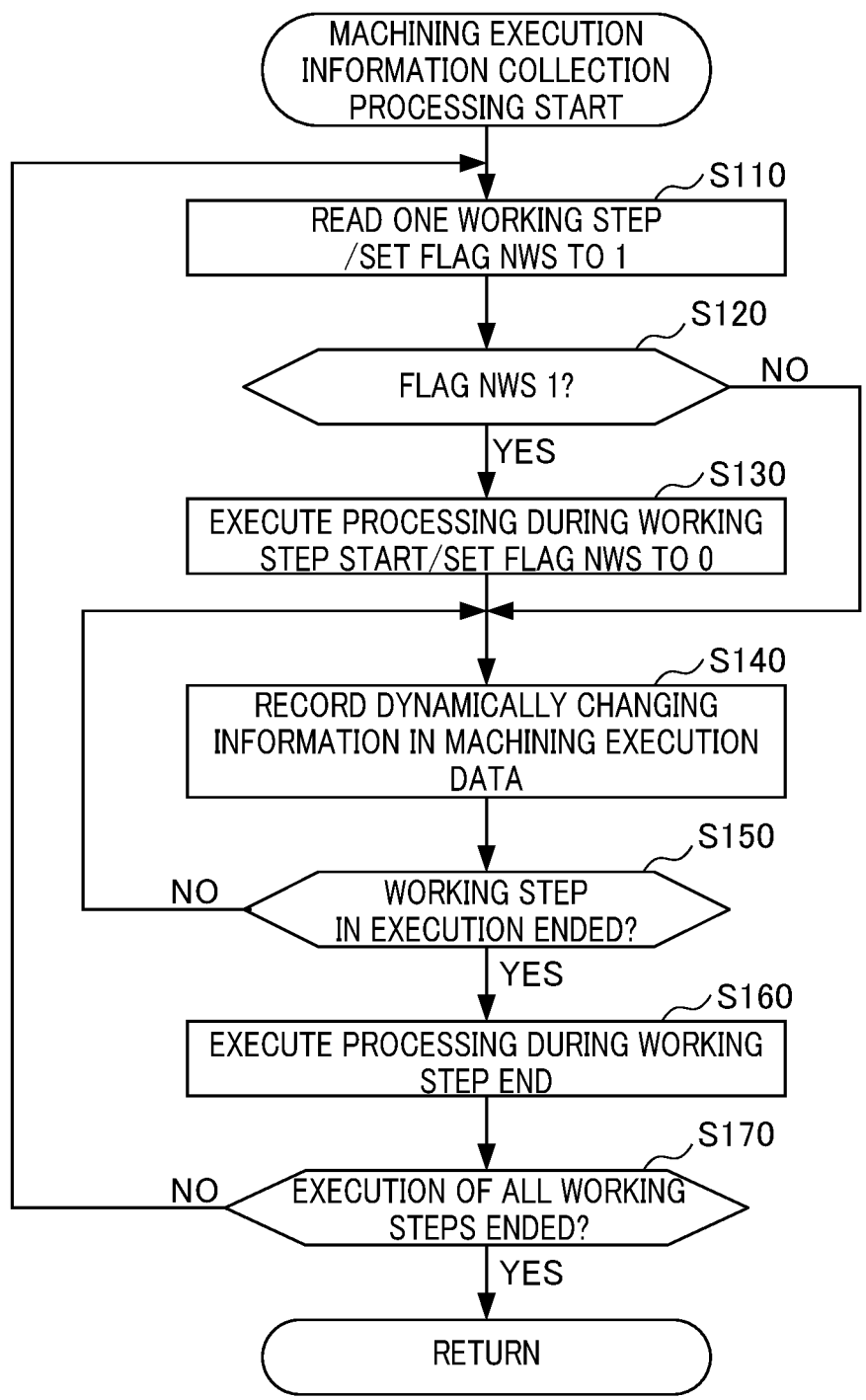
FIG. 12 is a flowchart for explaining the flow of machining execution information collection processing.

FIG. 12 is a flowchart for explaining the flow of machining execution information collection processing. In Step S110, the execution management unit 11f reads one working step in the machining command data, as well as setting the value of a flag NWS indicating the start of a new working step to 1. In Step S120, the execution management unit 11f performs determination as to whether or not the value of the flag NWS is 1. In the case of the value of the flag NWS not being 1, it is determined as NO in Step S120, and the processing advances to Step S140. On the other hand, in the case of the value of the flag NWS being 1, it is determined as YES in Step S120, and the processing advances to Step S130. In Step S130, the machining monitor unit 11g executes processing during start of the working step. At this time, the machining monitor unit 11g records the start time in the execution information of the working step of the machining execution data as processing during start of the working step, and the execution management unit 11f sets the value of the flag NWS to 0. In Step S140, the machining monitor unit 11g records dynamically changing information in the machining execution data. For example, the machining monitor unit 11g acquires, at a predetermined sampling period (e.g., tens of ms), the spindle load, feed shaft motor current, temperature of parts of the machine tool and inside/outside of machining room, temperature of coolant, and records in the machining execution data. In Step S150, the execution management unit 11f performs determination of whether or not a working step during execution has ended. In the case of the working step during execution not having ended, it is determined as NO in Step S150, and the processing advances to Step S140. On the other hand, in the case of the working step during execution having ended, it is determined as YES in Step S150, and the processing advances to Step S160. In Step S160, the machining monitor unit 11g executes processing during the end of the working step. At this time, as the processing during the end of the working step, the machining monitor unit 11g records the end time and cutting time in the machining execution data, as well as executing update processing of the tool usage recording. In Step S170, the execution management unit 11f performs determination as to whether or not execution of all of the working steps has ended. In the case of the execution of all working steps not having ended, it is determined as NO in Step S170, and the processing advances to Step S110. On the other hand, in the case of execution of all working steps having ended, it is determined as YES in Step S170, and the processing returns to the machining execution processing.

Update Processing of Tool Usage Recording

Figure 13:
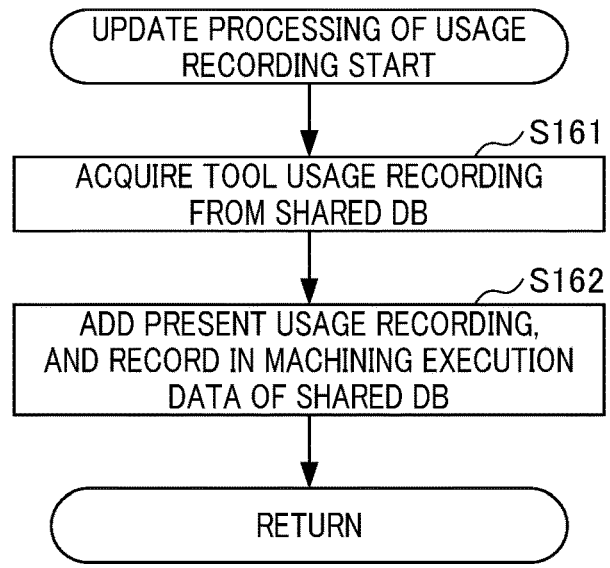
FIG. 13 is a flowchart for explaining the flow of update processing of usage recording of tools.

FIG. 13 is a flowchart for explaining the flow of update processing of the tool usage recording. In Step S161, the machining monitor unit 11g acquires the usage recording of the tool which serves as the target, from the machining resource data of the shared DB 1A. In Step S162, the machining monitor unit 11g adds the present usage recording to the usage recording of the tool serving as the target, and records in the machining resource data of the shared DB 1A. After Step S162, the processing returns to machining execution information collection/recording processing.

Usage Result Information Generation Processing

Figure 14:
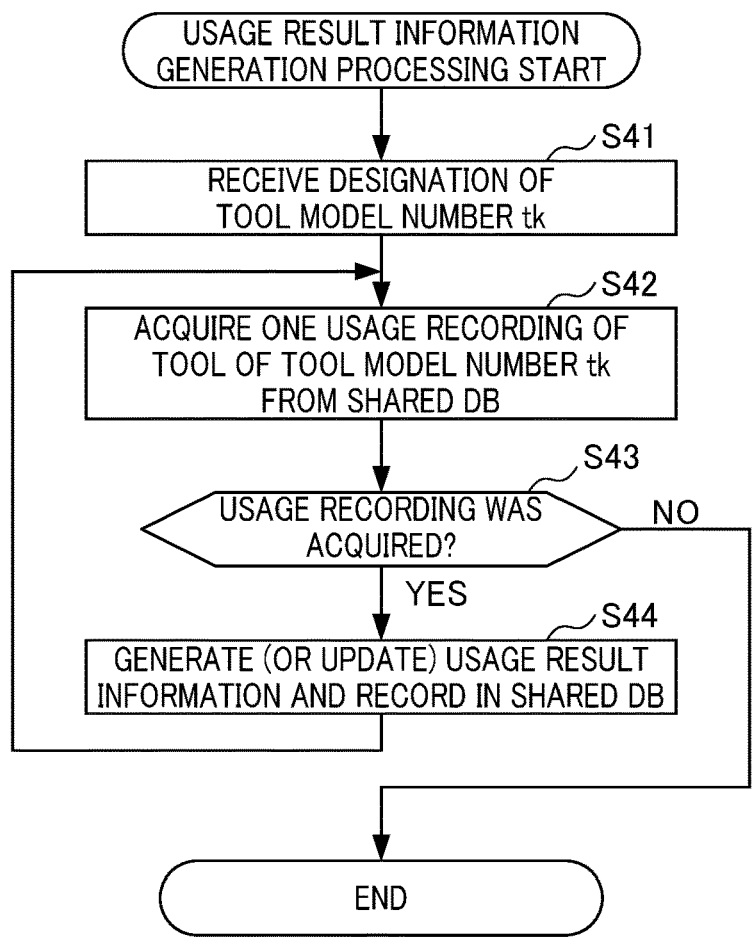
FIG. 14 is a flowchart for explaining the flow of usage result information generation processing executed by the production data management device, in a case exemplifying replacement of a tool.

FIG. 14 is a flowchart for explaining the flow of usage result information generation processing executed by the production data management device 1, in the case of exemplifying tool replacement. The usage result information generation processing is started by an instruction for launching usage result information generation processing being inputted via the input unit 14. It should be noted that usage result information generation processing may be configured to successively start at a timing at which the latest usage result information becomes necessary (e.g., timing prior to usage result information being referenced in replacement rule determination processing described later, or the like). In Step S41, the machining monitor unit 11g accepts a designation of tool model number tk. In Step S42, the machining monitor unit 11g acquires the data of usage recording of the tool of tool model number tk from the machining resource data in the shared DB 1A. At this time, the data of the usage recording of the decided tool is acquired from the machining resource data. In Step S43, the machining monitor unit 11g performs determination as to whether or not the data of the usage recording of the tool of tool model number tk was acquired. In the case of the data of the usage recording of the tool of tool model number tk having been acquired, it is determined as YES in Step S43, and the processing advances to Step S44. On the other hand, in the case of the data of the usage recording of the tool of tool model number tk not having been acquired, it is determined as NO in Step S43, and the usage result information generation processing comes to an end. In Step S44, the machining monitor unit 11g tracks back the machining execution data, based on the ID of the machining command data and ID of the working step in the data of the usage recording, and generates (or updates) the data of the usage result information of the tool of tool model number tk in every working step. In addition, the machining monitor unit 11g records the data of the generated (or updated) usage result information in the machining resource data of the shared DB 1A. After Step S44, the processing advances to Step S42.

Replacement Rule Determination Processing

Figure 15:
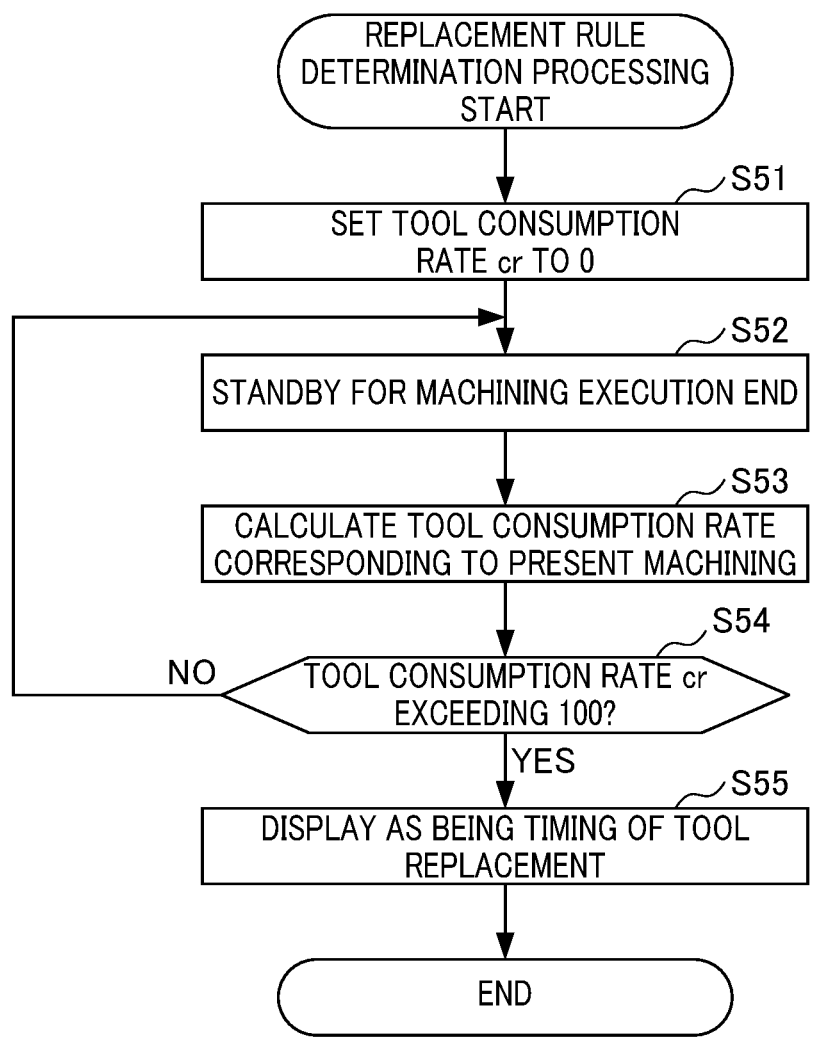
FIG. 15 is a flowchart for explaining the flow of replacement tool determination processing executed by the production data management device in a case of exemplifying replacement of a tool.

FIG. 15 is a flowchart for explaining the flow of replacement rule determination processing executed by the production data management device 1, in the case of exemplifying tool replacement. The replacement rule determination processing is started in the case of becoming a start condition set in advance by the user, or the case of the user inputting an instruction for start arbitrarily. Herein, in response to being determined by the state monitoring unit 1ie that the replacement work of a tool was completed (mounting of tool was completed), the replacement rule determination processing shall be started. In Step S51, the rule determination unit 11h sets the tool consumption rate cr to 0. In Step S52, the rule determination unit 11h stands by for the execution end of machining in the CNC machine tool 4. In Step S53, the rule determination unit 11h references the usage result information included in the machining execution data, calculates the tool consumption rate corresponding to the present machining, and adds to the tool consumption rate cr. In Step S54, the rule determination unit 11h performs determination as to whether or not the tool consumption rate cr exceeds 100. In the case of the tool consumption rate cr not exceeding 100, it is determined as NO in Step S54, and the processing advances to Step S52. On the other hand, in the case of the tool consumption rate cr exceeding 100, it is determined as YES in Step S54, and the processing advances to Step S55. In Step S55, the rule determination unit 11h displays the matter of being the timing of tool replacement on the display unit 15. After Step S55, the replacement rule determination processing comes to an end.

In the above way, in the integrated machining system S according to the present embodiment, the machining command data and machining execution data, which are execution results thereof, are configured as structured data having a hierarchical structure, and stored in the shared DIB 1A of the production data management device 1 to be associated with each other. In addition, the machining command data and machining execution data related to the various products are stored in the shared DB 1A. In addition, by the usage result information generation processing being executed in the production data management device 1, the related information in the shared DB 1A (for example, usage recording of tool of predetermined model number) is extracted and analyzed, and the usage result information is generated in which usage results for the same type of tool are collected. Then, in the case of the user demanding specific information (for example, replacement lifespan of tool of predetermined model number), the application for providing specific information (for example, replacement rule determination processing) is executed, the specific information demanded by the user is formed, and provided to the user. Therefore, according to the integrated machining system S according to the present embodiment, it is possible to more effectively use data related to machining by a machine tool which is numerically controlled.

Modified Example 1

In the aforementioned embodiment, it is explained as matter specifying the timing of tool replacement (i.e. extracting an indicator of replacement lifespan of a tool)

based on the machining execution data (for example, usage result information of tool); however, the production data in the shared DB 1A can be used for acquiring various information. For example, in the aforementioned embodiment, it is assumed as able to calculate the life consumption of a tool from the removed volume, etc.; however, a form can also be considered that first decides the tool lifespan determination rule of the user him/herself based on the usage result information of the tool, and after the determination rule has been decided, requires tool replacement according to the machining result information and the determination rule thereof. As the actual method, a method can be considered of obtaining the minimum value, average value and maximum value of usage time for every combination of model number of tool and material of the workpiece, deciding the tool replacement advance notice time and tool replacement demanded time from these values, and when the tool usage time reaches these values, displaying the tool lifespan proximity or tool replacement demand. In addition, in the production data management device 1, it is possible to retrieve working steps of past machining command data having compatible contents (working steps of same type) relative to the machining command data to be newly executed, for every working step in this machining command data, and then extract and analyze data such as of the execution start time and execution end time in this machining execution data. Then, for each working step of the machining command data to be newly executed, it is possible to calculate the machining estimated time of machining command data to be newly executed, by integrating the analysis results of the same type of working step. In this case, it is possible to cause the conditions to be appropriately reflected based on various elements of the machining command data such as machining estimated time according to the product shape, and calculate the machining estimated time. In addition, for example, in the production data management device 1, it is possible to retrieve machining execution data for the case of a malfunction occurring in machining, from the production data in the shared DB 1A, extract and analyze the machining situation for the case of a malfunction occurring, and establish machining technique information expressing a malfunction in machining. In this case, it is possible to analyze the data of the working step executed upon the malfunction occurring in the machining, and cause the conditions to be appropriately reflected based on the various elements related to machining such as the workplace, machining situation and machining environment, and perform analysis.

It should be noted that the present invention is not limited to the aforementioned embodiment and modified example, and that various changes, modifications, etc. are possible. For example, in the aforementioned embodiment, the production data management device 1 includes the shared DB 1A; however, it is not limited thereto. In other words, it may be configured to equip the shared DB 1A in another device with which the production data management device 1 can communicate via a network. In addition, the contents of the production data stored in the shared DB 1A are shown as one example, and the various types of data of each step in the production process can be stored and managed.

The entirety or part of the functions of the integrated machining system S of the above explained embodiment can be realized by hardware, software or a combination of these. Herein, being realized by software indicates the matter of being realized by a processor reading and executing programs. In the case of constituting by hardware, a part or the entirety of the functions of the integrated machining system S, for example, can be constituted by integrated circuits (IC) such as ASIC (Application Specific Integrated Circuit), gate array, FPGA (Field Programmable Gate Array), and CPLD (Complex Programmable Logic Device).

In the case of constituting the entirety or part of the functions of the integrated machining system S by software, it is possible to realize by storing the information required in computation into the DRAM of a computer configured by a storage unit such as a hard disk and ROM storing programs encoding the entirety or part of the operations of the integrated machining system S, DRAM storing the data required in computation, a CPU and a bus connecting each part, and causing these programs to be run by the CPU.

These programs can be stored using various types of computer readable media (computer readable medium), and supplied to a computer. The computer readable media includes various types of tangible storage media (tangible storage medium). Examples of computer readable media include magnetic media (for example, flexible disks, magnetic tape, hard disk drive), magneto-optical recording media (for example, magneto-optical disk), CD-ROM (Read Only Memory), CD-R, CD-R/W, DVD-ROM (Digital Versatile Disk), DVD-R, DVD-R/W, and semiconductor memory (for example, mask ROM, PROM (Programmable ROM), EPROM (Erasable PROM), flash ROM, RAM (random access memory)). In addition, these programs may be distributed by being downloaded to the user's computer via a network.

Although embodiments of the present invention were explained in detail above, the aforementioned embodiments are merely showing specific examples upon realizing the present invention. The technical scope of the present invention is not limited to the embodiments. To the present invention, various modifications in a scope not departing from the gist thereof are possible, and these are also included in the technical scope of the present invention.

EXPLANATION OF REFERENCE NUMERALS

S integrated machining system
1 production data management device
1A shared DB
2 CAD system
3 CAM system
4 CNC machine tool
5 peripheral equipment
6 measurement instrument
11 CPU
11a shape data acquisition unit
11b process design data acquisition unit
11c machining command data generation unit
11d post-processing unit
11e state monitoring unit
11f execution management unit
11g machining monitor unit
11h rule determination unit
11i machining technique information management unit
12 ROM
13 RAM
14 input unit
15 display unit
16 storage unit
17 communication unit

What is claimed is:
1. An integrated machining system comprising:
a machine tool device that performs machining with a tool;

a database that stores, as hierarchized structured data, production data related to steps from design until machining, the production data including data of machining commands to be executed by the machine tool device and data of machining history corresponding to the data of machining commands, the data of machining commands including data related to the tool and usage result information of the tool; and at least one processor configured to:
generate provided information representing an indicator of tool replacement to be provided externally, by way of acquiring at least either of the data of machining commands and the data of machining history from the database, and referencing a hierarchized structure to acquire elements of data related to specific information; and determine when the tool has been mounted to the machine tool device, wherein when the tool is mounted to the machine tool device, the at least one processor is configured to:
register the data related to the tool in the data of machining commands in the database;
set an initial tool consumption rate of the tool in the database;
obtain the usage result information when the tool is used;
update the initial tool consumption rate of the tool to a current tool consumption rate based on the usage result information in the database; and
determine that the tool needs to be replaced when the current tool consumption rate reaches a reference value for replacement, output the provided information indicating that the tool needs to be replaced, and stop the machine tool device to allow replacement of the tool.

2. The integrated machining system according to claim 1, further comprising a CAD system and a CAM, system,
wherein the machine tool device is a CNC machine tool.

3. The integrated machining system according to claim 1, wherein the at least one processor provides the provided information externally via an application program executed in the at least one processor.

4. The integrated machining system according to claim 1, wherein time information of each device included in the integrated machining system is synchronized.

5. The integrated machining system according to claim 1, wherein the at least one processor is also configured to provide, as the provided information, at least any of machining technique information which represents a specific machining result and information related to machining time.

6. An integrated machining method for a machine tool device that performs machining with a tool, the integrated machining method comprising:
storing, in a database, as hierarchized structured data, production data related to steps from design until machining, the production data including data of machining commands to be executed by the machine tool device and data of machining history corresponding to the data of machining commands, the data of machining commands including data related to the tool and usage result information of the tool;
generating, with at least one processor, provided information representing an indicator of tool replacement to be provided externally, by way of acquiring at least either of the data of machining commands and the data of machining history from the database, and referencing a hierarchized structure to acquire elements of data related to specific information; and determining, with the at least one processor, when the tool has been mounted to the machine tool device, wherein when the tool is mounted to the machine tool device:
registering, with the at least one processor, the data related to the tool in the data of machining commands in the database;
setting, with the at least one processor, an initial tool consumption rate of the tool in the database;
obtaining, with the at least one processor, the usage result information when the tool is used;
updating, with the at least one processor, the initial tool consumption rate of the tool to a current tool consumption rate based on the usage result information in the database; and
determining, with the at least one processor, that the tool needs to be replaced when the current tool consumption rate reaches a reference value for replacement, outputting the provided information indicating that the tool needs to be replaced, and stopping the machine tool device to allow replacement of the tool.

7. A non-transitory computer readable medium encoded with a program that causes a computer to execute an integrated machining method for a machine tool device that performs machining with a tool, the integrated machining method comprising:
generating provided information representing an indicator of tool replacement to be provided externally, by way of acquiring at least either of data of machining commands and data of machining history from a database, and referencing a hierarchized structure to acquire elements of data related to specific information; and
determining when the tool has been mounted to the machine tool device, wherein
when the tool is mounted to the machine tool device:
registering data related to the tool in the data of machining commands in the database;
setting an initial tool consumption rate of the tool in the database;
obtaining usage result information when the tool is used;
updating the initial tool consumption rate of the tool to a current tool consumption rate based on the usage result information in the database; and
determining that the tool needs to be replaced when the current tool consumption rate reaches a reference value for replacement, outputting the provided information indicating that the tool needs to be replaced, and stopping the machine tool device to allow replacement of the tool,
wherein the database stores, as hierarchized structured data, production data related to steps from design until machining, the production data including the data of machining commands to be executed by the machine tool device and the data of machining history corresponding to the data of machining commands, the data of machining commands including the data related to the tool and the usage result information of the tool.

\* \* \* \* \*